United States Patent [19]

Lande et al.

[11] Patent Number: 4,641,775
[45] Date of Patent: Feb. 10, 1987

[54] MEANS FOR SPLICING TWO PIPES

[75] Inventors: Göran Lande, Skärholmen; Bendt Persson, Olofström, both of Sweden

[73] Assignees: Nitro Nobel AB, Gyttorp; AB Volvo, Gothenburg, both of Sweden

[21] Appl. No.: 726,241

[22] Filed: Apr. 23, 1985

[30] Foreign Application Priority Data

May 14, 1984 [SE] Sweden ............................... 8402584

[51] Int. Cl.⁴ ............................................. B23K 20/08
[52] U.S. Cl. ...................................... 228/2.5; 228/107
[58] Field of Search ................. 228/2.5, 107, 108, 109

[56] References Cited

U.S. PATENT DOCUMENTS 3,343,248  9/1967  Silverman et al. .................... 228/2.5
3,578,233  5/1971  Meister et al. ........................ 228/107
3,761,004  9/1973  Hanson et al. ......................... 228/2.5

FOREIGN PATENT DOCUMENTS 766741  1/1957  United Kingdom ................. 228/2.5
2106817  4/1983  United Kingdom ................. 228/2.5
2142997  1/1985  United Kingdom ................ 228/107

Primary Examiner—M. Jordan
Attorney, Agent, or Firm—Dennison, Meserole, Pollack & Scheiner

[57] ABSTRACT

Explosion welding is used for splicing thick pipes (1 and 2) or the transport of oil and gas. A plating ring (4) and its explosive (7) are located inside the pipes, and a support (12 and 13) surrounding the two pipes (1 and 2) in order to limit the deformation occurring in the pipes (1 and 2) during the actual welding process. Since the pipes (1 and 2) are deformed, the support (12 and 13) will also be deformed. To enable repeated used of the support (12 and 13), the section (20) thereof which is subjected to the deformation is replaced by an elastomeric material.

7 Claims, 6 Drawing Figures

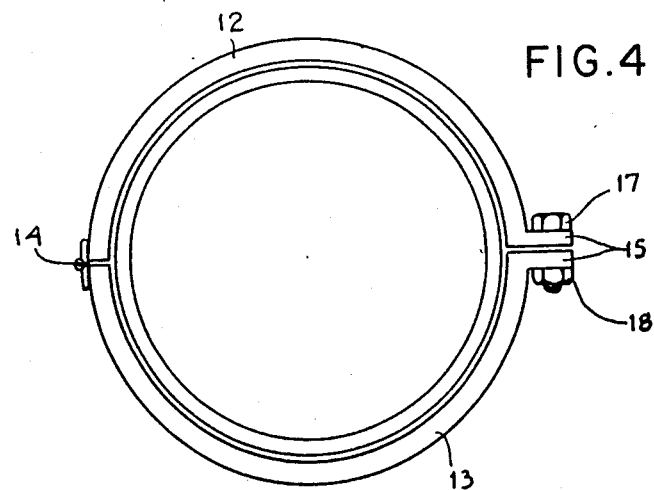
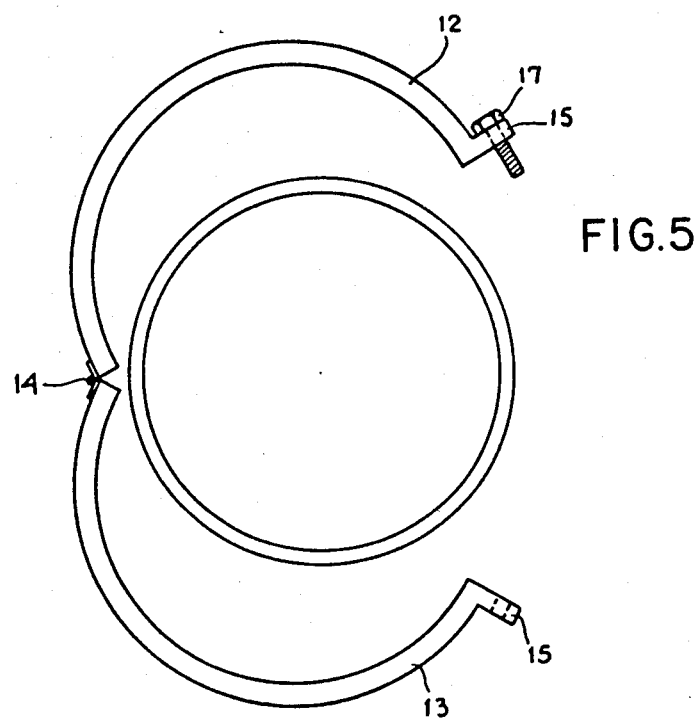

4,641,775

MEANS FOR SPLICING TWO PIPES

BACKGROUND OF THE INVENTION

The present invention relates to a means for splicing two pipes. The pipes for which the invention is primarily intended are metal pipes used for transporting oil and gas. The splice to be effected between two pipes is performed with the aid of explosive welding. In this type of welding, two pipe ends are brought into contact or almost contact with each other. A metal ring is arranged inside the two pipes and inside the point to be spliced, said ring forming a plating layer on the inner side of the two pipes. Said metal ring is provided internally with explosive which, when detonated, brings the metal ring into contact with the inside of the two pipes. To enable explosive welding, a support must be arranged on the surface of the pipes at the point where explosive welding is to be effected. The support may consist of a cylindrical tube which is also deformed when the explosive welding takes place and the surrounding support thus functions as an extra retaining reinforcement between the two pipes. The drawback with the support is that it is permanent and causes difficulty in establishing whether the explosion weld is satisfactory or not.

SUMMARY OF THE INVENTION

The object of the present invention is to strikingly change the support required for explosive welding so that the same support can be used for repeated explosion welds at different places along a pipeline. In practice this is enabled by the use of a support consisting of two pipe halves which can be clamped together by suitable means, said means remaining in tact during explosive welding. When fitted, the support has a peripheral recess which is partially or entirely filled with an elastomeric material such as rubber or polyurethane. The peripheral recess has such width and depth, and the elastomeric material such properties that when the peripheral recess with elastomeric material is placed at the point where explosive welding is to take place, a deformation in the two pipes and plating material will fall within the compass of the peripheral recess in the support. This enables a support to be used several times since the elastomeric material returns to its original shape when the support is removed from the point along the pipeline where the explosive welding occurred.

According to the invention it is suitable to arrange a thin layer of protective material inside the inner surface of the support and outside the outer surface of the two pipes to be spliced. The protective material may consists, for instance, of a thin tube of metal. One function of the tube is to retain the elastomeric layer in the inner peripheral recess of the support.

The protective layer is suitably provided between its ends with a coherent or sectioned flange directed radially inwards. Prior to explosive welding the flange will be located between the end surfaces of the pipes to be spliced, thus ensuring better positioning of the support.

If said flange is divided into a number of flange sections arranged one after the other, these can also be used to position the metal ring to be plated at the exposive welding. The metal ring then has a groove into which the flange sections can snap, thus positioning the metal ring at the splice point.

The metal ring intended for plating may be provided with spring-actuated pins directed radially outwards, designed to snap into the space which may be formed between two pipe ends and thus position the metal ring intended for plating.

BRIEF DESCRIPTION OF THE DRAWINGS

Further characteristics of the present invention are revealed in the accompanying drawings, in which FIG. 4 shows a support consisting of two pipe halves, ready assembled, FIG. 5 shows the support according to FIG. 4 with the pipe halves opened.

DESCRIPTION OF THE PREFERRED EMBODIMENTS

Figure 1:
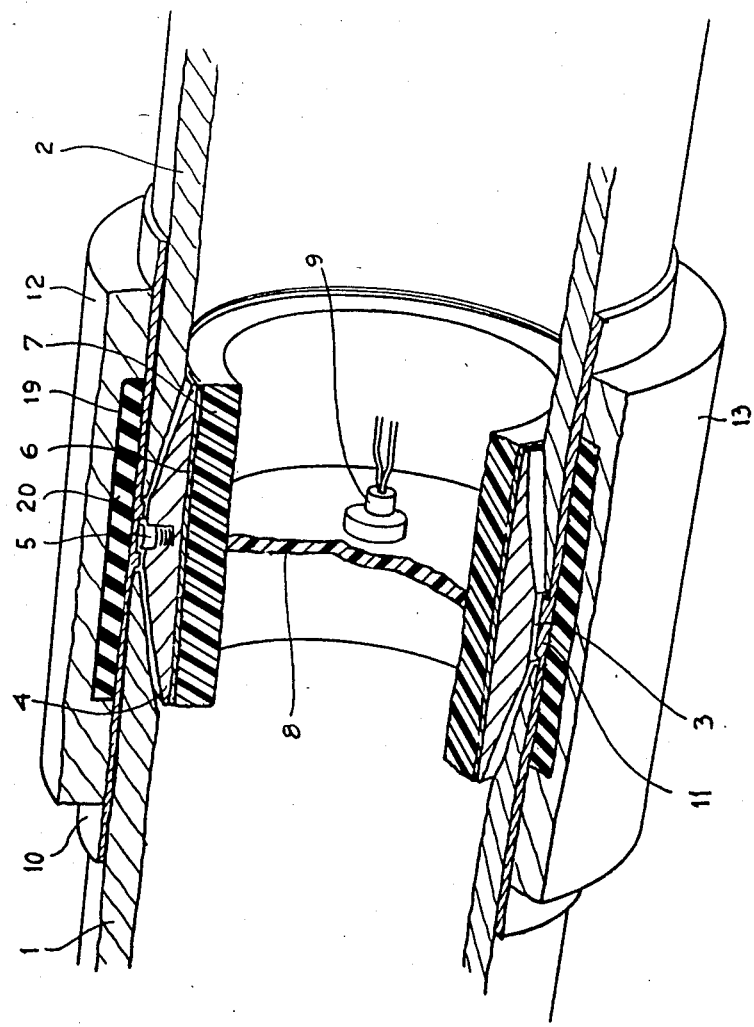
FIG. 1 shows two pipes at a splicing point, provided with a support and plating ring with explosive.
Figure 2:
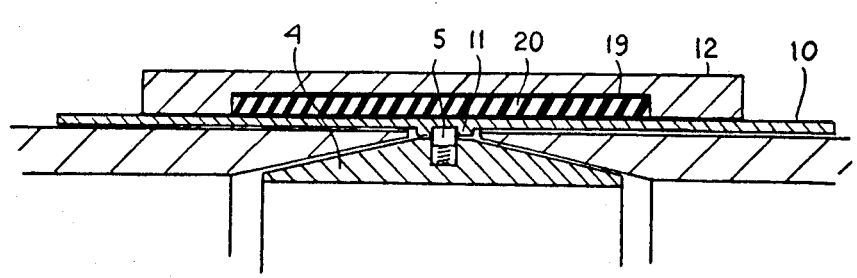
FIG. 2 shows the splicing point according to FIG. 1 in detail.
Figure 3:
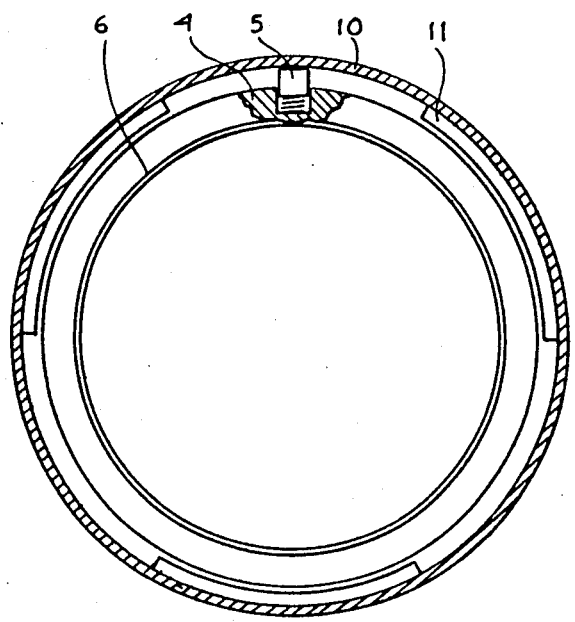
FIG. 3 shows a side view of the splicing point, provided with a protective layer having three flange sections.
Figure 6:
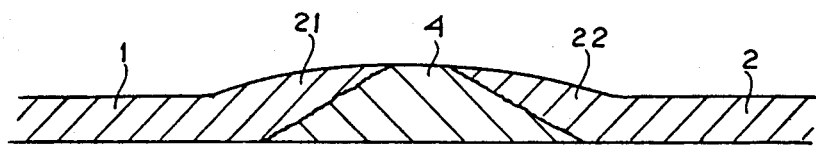
FIG. 6 shows the deformation which occurs at a splicing point as a result of explosive welding.

In the drawings, 1 and 2 denote two pipes to be spliced together. The opposing edges of pipes 1 and 2 are bevelled and a space 3 is arranged between them. Around the two pipes and over the splicing point is a thin layer 10, preferably of metal, arranged by way of protection on the outer surfaces of the pipes 1 and 2, covering the space 3. Between the ends of the protective layer is a flange 11, directed radially inwards and consisting of a number of sections directed radially inwards and spaced from each other. The flange sections cooperate with a radially peripheral groove in a splice section 4 of metal. The splice part 4 is intended to be plated on the inner surfaces of the two pipes 1 and 2. The splice part 4 is substantially rectangular in cross-section. Along its periphery the splice part 4 is provided with one or more spring-actuated pins 5 designed to snap into the space 3. The splice part 4 is annular and is provided with a protective layer 6 on its inner surface. On the protective layer is applied a cylindrical section 7 consisting of explosive such as dynamite, dynamex or trinitrotoluene. Inside this cylindrical body of explosive is a disc 8, which shall constitute a detonating charge such as pentyl and explosive paste. The disc 8 contains a detonator 9 to initiate it. A support is applied on the protective layer 10, consisting of two pipe halves 12 and 13, joined at a hinge 14. The pipe halves are also provide with two outwardly directed flanges 15 and 16 joined together by means of bolt 17 and nut 18. The support has an internal recess 19 filled with resilient material 20 of such a nature that if it is subjected to pressure it will be compressed but will recover its original form when the pressure has disappeared. Suitable material for the resilient material is rubber which should have a hardness in the order of magnitude of 50–60 shore.

The arrangement described above functions in the following way:

On the pipe 1 is a protective layer 10 arranged so that its radially inwardly directed flange 11 is located by or at a small distance from the right side of the pipe 1. Then, the body, preferably prefabricated and consisting of parts 4 through 9, is inserted in the protective layer 10 so far that the flange sections 11 snap into a peripheral groove, not shown, the outer surface of said body. If the body has one or more spring-actuated pins 5, these will abut the inner surface of the protective layer. The inward movement of the body composed of parts 4–9 is limited either by contact of the pins 5 with the radial flange 11 or by the righthand edge of the pipe 1. After the body with parts 4–9 has been inserted in the protective layer 10, the lefthand end of pipe 2 is inserted so that its lefthand edge is a short distance from the pipe 1, thus forming a space 3 between pipes 1 and 2. The existence of the protective layer 10 facilitates placing the support with pipe halves 12 and 13 symmetrically over the splicing point with the space 3. The pipe halves 12 and 13 are applied opened with the aid of the hinge 14. They are brought into satisfactory abutment with the pipes 1 and 2 by joining the flanges 15 and 16 by means of bolt 17 and nut 18. Upon detonation of part 7 consisting of explosive, an explosion weld will be effected and the ends of pipes 1 and 2 will be deformed and form a peripheral bulge or the like consisting of two parts 21 and 22 of pipes 1 and 2. The bulge will have a width and a height which fits into the space formed by the recess 19. Thanks to the presence of the elastomeric material 20, only the two pipes 1 and 2 will be deformed during the welding process. There will be no deformation of the support with its pipe halves 12 and 13 since the weld itself transmits a deformation to only the flexible material 20. The deformation in the support with pipe halves 12 and 13 will only occur in that part containing the flexible material. When welding is complete, the nut and bolt joint 17,18 is loosened and the two pipe halves 12,13 of the support can be moved to a new welding point. The explosion weld just effected can now be checked without difficulty.

Considerable savings are made by using a support with pipe halves 12 an 13, since such a support can be used for a large number of welds. Should a certain amount of wear occur, it is only necessary to replace the flexible material 20.

A support according to the present invention is unusually robust and it is not unknown for such a support to be used for over a thousand explosion welds.

What is claimed is:

1. In a means for splicing two pipes with the aid of explosion welding, each pipe having an end edge, the end edges facing each other and forming a splicing point, said means comprising a ring or tube for plating arranged inside the pipes and extending from the splicing point into each pipe, an explosive and detonator therefor, arranged internal to said ring or tube, and an external support having a cylindrical inner surface arranged at said splicing point, said inner surface substantially abutting the outer surfaces of the two pipes, said support having at least the axial extension of said ring or tube, the improvement wherein said external support is removable and reusable, and comprises two halves of semicircular internal cross-section, and means for firmly joining together and unjoining said two halves, the inner surface of said support being provided with a circumferential recess which is at least partially filled with a resilient material, and which recess is positioned adjacent said splicing point, the dimensions of the recess and the properties of said resilient material being selected so that the deformation of the pipes when explosion welded will fall within the recess and deform said resilient material, without substantial deformation of the remainder of said support, wherein said deformed resilient material will return to its original shape when said support is removed from said welded pipes, thereby making said support reusable, and wherein a thin layer of metal is arranged between the inner surface of said support and the outer surfaces of said two pipes, said layer having a coherent or partially broken, inwardly directed flange located at said splicing point provided with at least one outwardly directed notch, and the ring or tube is provided with at least one outwardly directed spring activated pin adapted to cooperate with said at least one notch.

2. A means according to claim 1, characterised in that the resilient material (20) consists of rubber.

3. A means according to claim 2, characterised in that the rubber (20) has a hardness in the order of magnitude 50–60 shore.

4. A means according to claim 1, characterised in that the resilient material (20) comprises polyurethane.

5. A means according to claim 1, 2, or 3, characterised in that the layer (10) comprises a tube.

6. A means according to claim 1, 2 or 3, characterised in that the peripheral flange (11), is broken and is designed to cooperate with a peripheral groove in the plating ring (4) to position said flange.

7. In a means for splicing two pipes with the aid of explosion welding, each pipe having an end edge, the end edges facing each other and forming a splicing point, said means comprising a ring or tube for plating arranged inside the pipes and extending from the splicing point into each pipe, an explosive and detonator therefor, arranged internal to said ring or tube, and an external support having a cylindrical inner surface arranged at said splicing point, said inner surface substantially abutting the outer surfaces of the two pipes, said support having at least the axial extension of said ring or tube, the improvement wherein said external support is removable and reusable, and comprises two halves of semicircular internal cross-section, and means for firmly joining together and unjoining said two halves, the inner surface of said support being provided with a circumferential recess which is at least partially filled with a resilient material, and which recess is positioned adjacent said splicing point, the dimensions of the recess and the properties of said resilient material being selected so that the deformation of the pipes when explosion welded will fall within the recess and deform said resilient material, without substantial deformation of the remainder of said support, wherein said resilient material comprises rubber having a hardness in the order of magnitude 50–60 shore, and wherein said deformed resilient material will return to its original shape when said support is removed from said welded pipes, thereby making said support reusable.

* * * * *